US005826472A

United States Patent [19]

Tamura et al.

[11] Patent Number: 5,826,472

[45] Date of Patent: Oct. 27, 1998

[54] METHOD AND APPARATUS FOR PROCESSING A WIRE

[75] Inventors: Yoshikazu Tamura; Yoshinori Yamashita, both of Kanazawa, Japan

[73] Assignee: Sumitomo Wiring Systems, Ltd., Japan

[21] Appl. No.: 713,238

[22] Filed: Sep. 12, 1996

[30] Foreign Application Priority Data

Oct. 19, 1995 [JP] Japan .................................... 7-271503

[51] Int. Cl.[6] ...................................................... B23Q 15/20

[52] U.S. Cl. .................................... 83/72; 83/73; 83/76.8; 83/363; 83/369; 83/907; 83/950

[58] Field of Search .............................. 83/907, 947, 950, 83/72, 73, 74, 76.6–76.8, 76.1, 360, 361, 363, 369, 370

[56] References Cited

U.S. PATENT DOCUMENTS 5,477,463 12/1995 Tamura .............................. 29/33 M X

FOREIGN PATENT DOCUMENTS 6-2646 4/1994 Japan .

2283695 5/1995 United Kingdom .

2283835 5/1995 United Kingdom .

*Primary Examiner*—Maurina T. Rachuba

*Attorney, Agent, or Firm*—Anthony J. Casella; Gerald E. Hespos; Ludomir A. Budzyn

[57] ABSTRACT

A wire processing apparatus is provided with a prefeeder 120, a feeding unit 12 and an accumulator 110 therebetween. A detector is provided to determine if there is a cause for stopping the prefeeder 120. In response to such a detected cause, a controller stops the prefeeder 120 while simultaneously permitting the feeding unit 12 to draw a wire from the accumulator to permit continued operation of the wire processing apparatus.

10 Claims, 11 Drawing Sheets

METHOD AND APPARATUS FOR PROCESSING A WIRE

BACKGROUND OF THE INVENTION

1. Field of the Invention

The present invention relates to a method and an apparatus for processing a wire and, particularly to wire processing method and apparatus for cutting a wire as an element of a wiring harness to a predetermined length.

2. Description of the Prior Art

Generally in the manufacturing of wiring harnesses, it is necessary to feed a wire from a wire reel and measurably cut it to a predetermined length. Such a wire cutting operation is performed using a wire processing apparatus including a press-cutting apparatus as a main component.

For example, the wire processing apparatus disclosed in Japanese Unexamined Patent Publication No. 6-26346 is constructed such that the length of a wire is measured by feeding the wire along a predetermined pass line having a specified length from a press-cutting apparatus and the fed wire is cut to a predetermined length by the press-cutting apparatus.

If the end of the wire enters the pass line in the case that the wire has run short or the wire is changed to another kind, it is necessary to temporarily stop the operation of the cutting apparatus and to set a wire material again. Accordingly, it is a general practice to connect the wires before the end of the wire enters the pass line so as to continuously feed the wire.

However, with the prior art construction, the operation of the cutting apparatus needs to be interrupted for a variety of reasons.

First of all, since the length of the pass line cannot be changed in the prior art construction, the cutting apparatus needs to be temporarily stopped, when the wire is changed to another kind, so as not to waste an end portion of the wire. Specifically, in the case that 500 processed wires of 3 m are produced by feeding the wire along a pass line of 11 m, the cutting apparatus is stopped when the remaining wire is 3 n meter (where 3 n (n=4 in this example) is a minimum integer above the length of the pass line (after cutting 496 wires in this case)), a difference between the length of the remaining wire and the length of the pass line, namely $3\text{ m}\times 4-11\text{ m}=1$ m is calculated. A next wire to be processed is connected after a wire of 1 m is added. In order to add the wire of 1 m, the cutting apparatus needs to be temporarily stopped.

In the case that the wire is entangled, the cutting apparatus also needs to be temporarily stopped so as to disentangle the wire.

Further, in the case that a joint of the wires is disconnected, the end of the disconnected wire enters the pass line since there is no method of detecting it before the entrance of the wire end into the pass line. Thus, the cutting apparatus needs to be stopped to connect the wires.

In view of the above problem, an object of the present invention is to provide wire processing method and apparatus capable of reducing the necessity to interrupt the operation of a cutting apparatus.

SUMMARY OF THE INVENTION

According to the invention there is provided a wire processing method for producing a processed wire by measuring a wire material fed to a pass line by a prefeeder and cutting the wire material in a cutting position on the pass line by a cutting apparatus, comprising the steps of: detecting during wire processing whether there is a prefeeder stop cause which requires the prefeeder to be stopped, and stopping the prefeeder and continuing the operation of the cutting apparatus by changing the length of the pass line while the operation of the prefeeder is interrupted, when the prefeeder stop cause is detected.

According to a preferred embodiment of the invention, the step of stopping the prefeeder and continuing the operation of the cutting apparatus comprises the step of varying the length of the pass line between a maximum pass line length $R_{MAX}$ and a minimum pass line length $R_{MIN}$.

Further preferably, the operation of the cutting apparatus is continued unless the length R of the pass line satisfies a condition, $R<R_{MIN}+L$ where L denotes the length of the processed wire to be produced.

Still further preferably, the determining of the prefeeder stop cause comprises at least one of the following steps: detecting that a kind of produced wire is changed, detecting that a wire entangling has occurred, detecting that a wire joint disconnection has occurred and detecting, in the case that the number of wire cutting to be performed reaches a number which is smaller than the number of lots to be produced by a predetermined number N, that the length R of the pass line is substantially $L\times N$, wherein L denotes the length of the processed wire to be produced.

According to the invention there is further provided a wire processing apparatus, in particular for carrying out a method according to one or more of the preceding claims, comprising: a prefeeder for feeding a wire to a pass line, a cutting apparatus for cutting the wire being fed in a cutting position on the pass line, a path length adjusting or varying mechanism which is disposed in the pass line between the prefeeder and the cutting position to change the length of the pass line, a detector means for detecting during wire processing whether there is any prefeeder stop cause which requires the prefeeder to be stopped, and a controller means for stopping the prefeeder and causing the cutting apparatus to continue its operation by changing the length of the pass line while the operation of the prefeeder is interrupted, when the detector means detects the prefeeder stop cause.

According to a preferred embodiment of the invention, the path length adjusting or varying mechanism is an accumulator capable of gradually and/or continuously changing the length of the pass line, in particular between a maximum pass line length $R_{MAX}$ and a minimum pass line length $R_{MIN}$, and particularly wherein the controller means stops the cutting apparatus when the length of the pass line satisfies a condition, $R<R_{MIN}+L$ where R and L denote the length of the pass line and the length of the processed wire to be produced, respectively while the operation of the prefeeder is interrupted.

Still further preferably, the controller means stops the cutting apparatus while the operation of the prefeeder is interrupted and when the length R of the pass line satisfies a condition, $R<R_{MIN}+L$ where L denotes the length of the processed wire to be produced, particularly while the operation of the prefeeder is interrupted.

According to a further preferred embodiment of the invention, in the case that the number of wire cuttings by the cutting apparatus reaches a number which is smaller by a predetermined number N than the number of lots to be produced, the controller means controls the prefeeder and stops it when the length R of the pass line is substantially $N\times L$.

Preferably, the number N is determined: $N=INT(R_{MAX}/L)$ where INT is a round-down function to obtain an integer.

Still further preferably, the detector means determines that a wire disconnection has occurred if the wire is fed to the path length varying means or accumulator at a higher speed than the feeding speed of the prefeeder.

According to the invention there is provided a wire processing method for producing a processed wire by measuring a wire material fed to a pass line by a prefeeder and cutting the wire material in a cutting position on the pass line by a cutting apparatus, comprising the steps of:

detecting during wire processing whether there is a prefeeder stop cause which requires the prefeeder to be stopped, and stopping the prefeeder and continuing the operation of the cutting apparatus by changing the length of the pass line while the operation of the prefeeder is interrupted, when the prefeeder stop cause is detected.

With the above method, even upon occurrence of the prefeeder stop cause, the cutting apparatus is not immediately stopped. Here, the "prefeeder stop cause" refers in particular to a case where the wire processing by the cutting apparatus is to be hindered unless the prefeeder is stopped. For example, it may be a case where the kind of the wire is changed, a case where the wire is entangled or a case where a wire joint is disconnected.

According to a preferred embodiment of the invention, the step of stopping the prefeeder and continuing the operation of the cutting apparatus comprises the step of varying the length of the pass line between a maximum pass line length $R_{MAX}$ and a minimum pass line length $R_{MIN}$.

Preferably, the operation of the cutting apparatus is continued unless the length R of the pass line satisfies a condition, $R<R_{MIN}+L$ where L denotes the length of the processed wire to be produced.

Further preferably, the determining of the prefeeder stop cause comprises at least one of the following steps: detecting that a kind of produced wire is changed, detecting that a wire entangling has occurred, detecting that a wire joint disconnection has occurred and detecting, in the case that the number of wire cutting to be performed reaches a number which is smaller than the number of lots to be produced by a predetermined number N, that the length R of the pass line is substantially L×N, wherein L denotes the length of the processed wire to be produced.

According to the invention there is further provided a wire processing apparatus, in particular for carrying out the method according to the invention, comprising:

a prefeeder for feeding a wire to a pass line, a cutting apparatus for cutting the wire being fed in a cutting position on the pass line, a path length adjusting mechanism which is disposed in the pass line between the prefeeder and the cutting position to change the length of the pass line, a detector means for detecting during wire processing whether there is a prefeeder stop cause which requires the prefeeder to be stopped, and a controller means for stopping the prefeeder and causing the cutting apparatus to continue its operation by changing the length of the pass line while the operation of the prefeeder is interrupted, when the detector means detects the prefeeder stop cause.

With this construction, the controller means controls the prefeeder to feed the wire to the pass line and then to the cutting apparatus. The cutting apparatus is not immediately stopped even upon occurrence of the prefeeder stop cause, continuing wire processing.

As described above, even if the wire processing is to be hindered unless the prefeeder is stopped in the case that the kind of the wire is changed, the wire W is entangled or the wire joint is disconnected, the cutting apparatus needs not be immediately stopped, thereby realizing a remarkable effect that the operation of the cutting apparatus needs to be least interrupted.

According to a preferred embodiment of the invention, the path length varying or adjusting mechanism is an accumulator capable of gradually and/or continuously changing the length of the pass line, in particular between a maximum pass line length $R_{MAX}$ and a minimum pass line length $R_{MIN}$, and preferably the controller means stops the cutting apparatus when the length of the pass line satisfies a condition, $R<R_{MIN}+L$ where R and L denote the length of the pass line and the length of the processed wire to be produced, respectively while the operation of the prefeeder is interrupted.

With this construction, while the wire is stored in the accumulator, the cutting apparatus is enabled to continue its operation without being stopped.

Further preferably, in the case that the number of wire cutting by the cutting apparatus reaches a number which is smaller by a predetermined number N than the number of lots to be produced, the controller means controls the prefeeder and stops it when the length R of the pass line is N×L.

With this construction, the kind of the wire can be exchanged without stopping the cutting apparatus. Further, no wire is wasted during the wire exchange by controlling the prefeeder so as to make the length R of the pass line a multiple of the processed wire to be produced.

Particularly, the length R of the pass line can be changed to L×N during the wire exchange. Accordingly, in addition to no need to stop the cutting apparatus, there is an advantage that material can be effectively used since no wire is wasted.

Preferably, in the wire processing apparatus of claim 4, the number N is determined: $N=INT(R_{MAX}/L)$ where INT is a round-down function to obtain an integer.

With this construction, by setting $N=INT(R_{MAX}/L)$, the prefeeder can be stopped when the wire most effectively remains in the pass line.

Accordingly, by setting $N=INT(R_{MAX}/L)$, the prefeeder can be stopped when the wire most effectively remains in the pass line. As a result, it takes a longer time for the pass line length R to satisfy the condition: $R<R_{MIN}+L$ after the prefeeder is stopped. This advantageously lengthens a time to perform the wire exchange operation without interrupting the operation of the cutting apparatus.

Still further preferably, the detector means determines that a wire disconnection has occurred if the wire is fed to the path length varying or adjusting means, in particular accumulator at a higher speed than the feeding speed of the prefeeder.

With this construction, the wire disconnection can be detected before the entrance of the wire end into the pass line without providing any special sensor.

Thus, the wire disconnection can be detected before the entrance of the wire end into the pass line without providing any special sensor. Accordingly, an undesirable entrance of the wire end into the pass line can be advantageously prevented without increasing the number of parts.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENT

Figure 1:
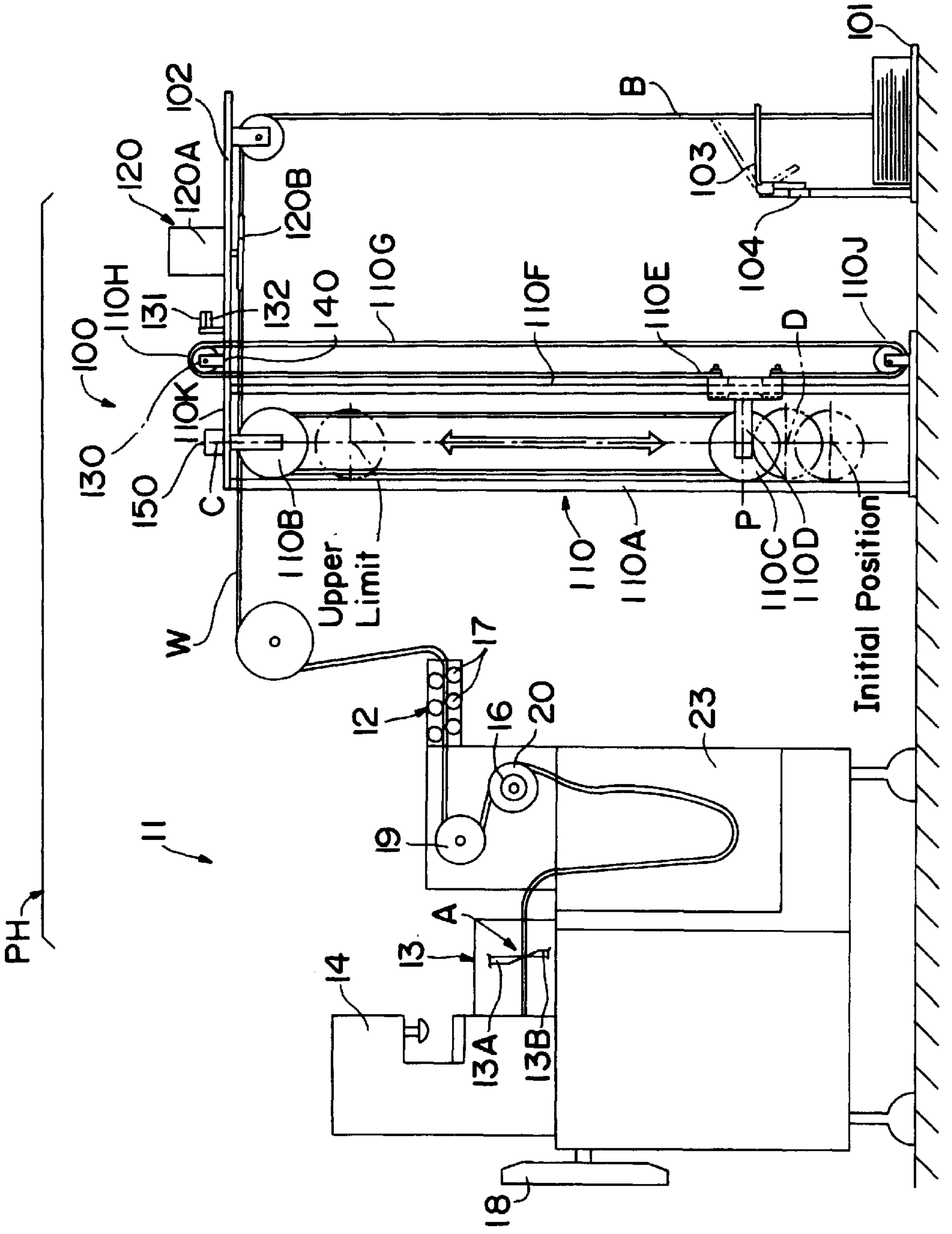
FIG. 1 is a schematic construction diagram of an apparatus for processing wires for a wiring harness according to a preferred embodiment of the invention.

With reference to FIG. 1, the wire processing apparatus includes a cutting apparatus 11 for producing wires of a predetermined length for wiring harnesses and a wire feeder 100 for feeding a wire to the cutting device 11.

The cutting apparatus is of a known type provided with a feeding unit 12 for feeding the wire by a predetermined length, a cutting/peeling unit 13, a first terminal mounting unit 14, and a second terminal mounting unit (not illustrated).

The feeding unit 12 includes a straightener 17 for straightening a wire W, and first and second feed rollers 19, 20 disposed downstream from the straightener 17. For example, on the second feed roller 20 is mounted an encoder 16 which uses the second feed roller 20 as a rotary plate. The encoder 16 is adapted to measure a fed amount of the wire W by the second feed roller 20. Accordingly, the feeding unit 12 straightens the wire W by means of the straightener 17, feeds the wire W by means of the feed rollers 19, 20, and measures the fed length of the wire W by means of the encoder 16. It should be appreciated that the encoder 16 may be mounted on or comprised in the first feed roller 19.

The wire W fed by the feeding unit 12 is further fed to the cutting/peeling unit 13 via a storage or pool 23. The cutting/peeling unit 13 includes a plurality of pairs of cutter groups 13A, 13B. The cutter groups 13A, 13B cut the wire W to a predetermined length and apply peeling to the leading and/or trailing ends of the cut wire W. The peeled leading end of the wire W is conveyed to the first terminal mounting unit 14 by a rotary arm mechanism, and at least one terminal is mounted thereon. The wire W having a terminal mounted on its leading end is transferred to an index table 18. The index table 18 conveys the wire W to the second terminal mounting unit 15, which then mounts a terminal on the wire W.

The wire feeder 100 adopted in the construction shown in FIG. 1 includes an arrangement table 101 for arranging the bundled wire W as a supply source, a feed guide 102 for guidably feeding the wire W fed from the arrangement table 101 to the feeding unit 12 of the cutting apparatus 11, the accumulator 110 which is disposed in an intermediate position of the feed guide 102 to store the wire W being fed therein, and a prefeeder 120 for feeding the wire W to the accumulator 110.

The arrangement table 101 is formed with a frame which supports a detector that includes a pivotal arm 103 through which the wire W is inserted. A limit switch 104 is mounted on the pivotal arm 103 to detect an upward pivotal movement of the pivotal arm 103. Accordingly, even if the bundled wire W is entangled, the wire W causes the pivotal arm 103 to pivot as indicated by phantom line in FIG. 1. Such a movement of the pivotal arm 103 is detected by the limit switch 104, thereby detecting the entanglement of the wire W.

Figure 11:
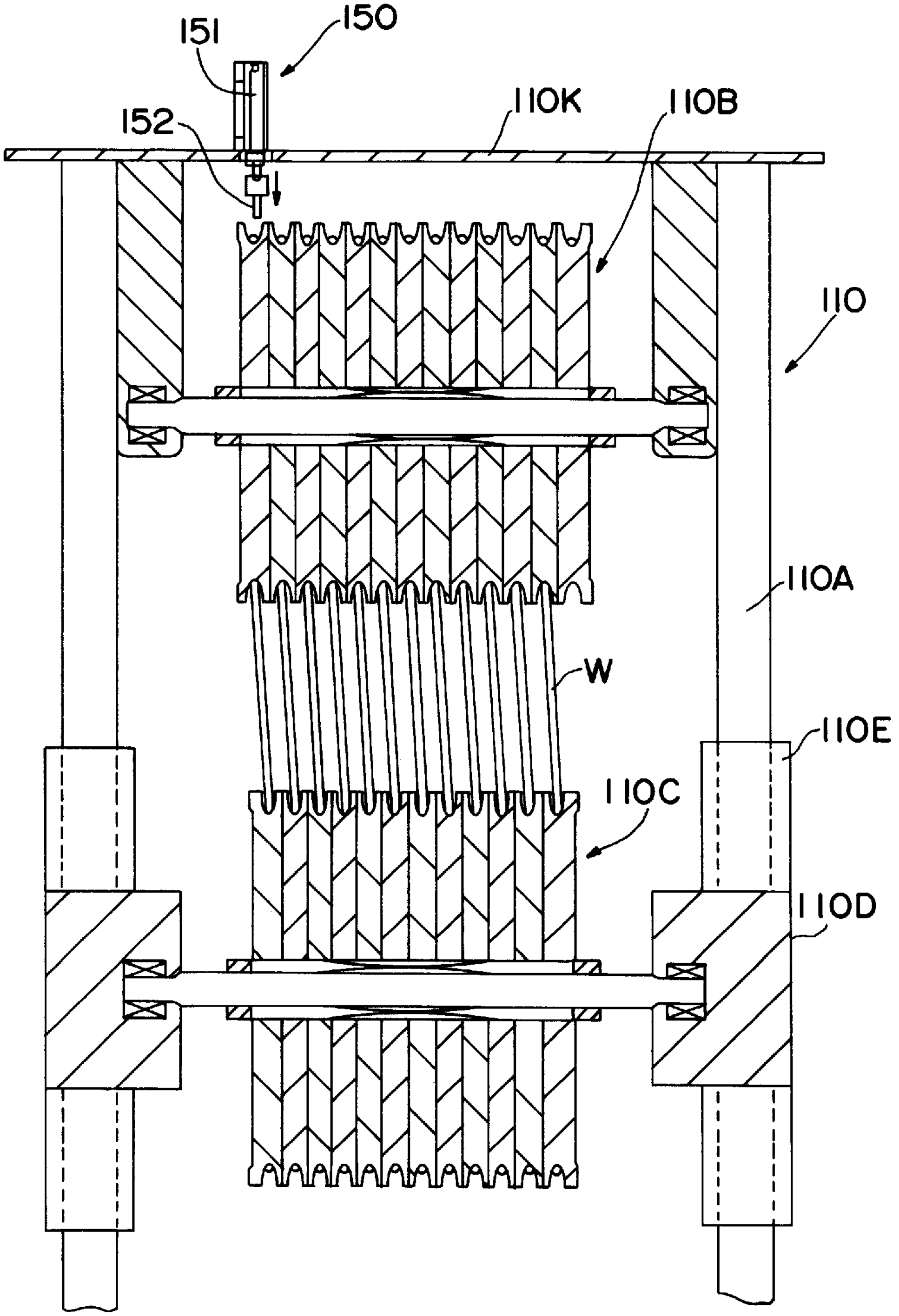
FIG. 11 is a section enlargedly showing an essential portion of the accumulator of FIG. 1.

Referring also to FIG. 11, the accumulator 110 includes a frame 110A substantially in the form of rectangular columns, a fixed roller 110B mounted on the upper end of the frame 110A to guide the wire W in a fixed position, and a movable roller 110C for guiding the wire W in cooperation with the fixed roller 110B. The wire W fed by the prefeeder 120 to be described later is first fed to the fixed roller 110B. The wire W is fed to the cutting apparatus 11 after being stored by being wound around the fixed roller 110B and the movable roller 110C, in particular about several times.

The movable roller 110C rests on bearings 110D secured to linear bushes 110E. The linear bushes 110E are slidably coupled with a linear shaft 110F mounted on to the frame 110A. Accordingly, the movable roller 110C is movable upward and downward along the linear shaft 110F. As the movable roller 110C moves downward, a feed path of the wire W is lengthened, thereby increasing an amount of the wire W to be stored.

Opposite ends of a timing belt 110G are secured to the linear bush 110E. The timing belt 110G is stretchingly mounted on pulleys 110H and 110J disposed at the upper and lower ends of the frame 110A. The pulleys 110H and 110J rotate as the movable roller 110C is displaced. On one pulley (the upper pulley in the example shown in FIG. 1) 110H is mounted an encoder 130 which uses the pulley 110H as a rotary plate. The encoder 130 is of three channel type having A-, B- and Z-phases. By detecting an angular position and a rotating direction of the pulley 110H, the encoder 130 detects a feeding speed of the wire W and the position of the movable roller 110C, and sends a detection signal to a controlling unit 40 to be described later.

The pulley 110H is also provided with a brake 140 capable of stopping the feed of the wire W. On the other hand, as shown in FIG. 11, a wire holder 150 is mounted on a ceiling or top portion 110K of the frame 110A. The wire holder 150 includes a cylinder 151 secured to the ceiling portion 110K, and a rod 152 which is driven by the cylinder 151 to press the wire W located in a most upstream groove of the fixed roller 110B. By extending the rod 152 to hold the wire W between the fixed roller 110B and the rod 152, the feed of the wire W to the accumulator 110 is deterred while allowing the feed of the wire W from the accumulator 110.

The accumulator 110 is provided with an upper limit switch 131 for detecting the upper limit of the moving range of the movable roller 110C. The accumulator 110 is also provided with an initial position dog (switch) 132 for detecting an initial position of the movable roller 110C. When the initial position dog 132 is on and the Z-phase of the encoder 130 is on, the movable roller 110C is assumed to be in its initial position (a control is such that the prefeeder 120 is stopped when the movable roller 110C reaches its initial position).

A pass line PH for feeding the wire W is formed between the wire feeder 110 and the cutting apparatus 11. A length R of the pass line PH is determined based on a path between a downstream wire cutting position A where the wire W is cut by the cutter groups 13A, 13B of the cutting apparatus 11 and an upstream position which defines a wire withdrawing portion B of the wire feeder 100. The length R is used during the control of the apparatus as described below and with reference to FIG. 8 and 9. The wire withdrawing portion B is not limited to the position shown in FIG. 1, but may be freely set to a position in proximity to the wire bundle.

The prefeeder 120 is of a known type having a motor 120A mounted on the feed guide 102 and a pulley 120B which is drivingly rotated by the motor 120A. The prefeeder 120 feeds the wire W by the pulley 120B. The prefeeder 120 of FIG. 1 is so constructed as to feed the wire W at a plurality of speeds in accordance with a control of the controlling unit 40.

Figure 2:
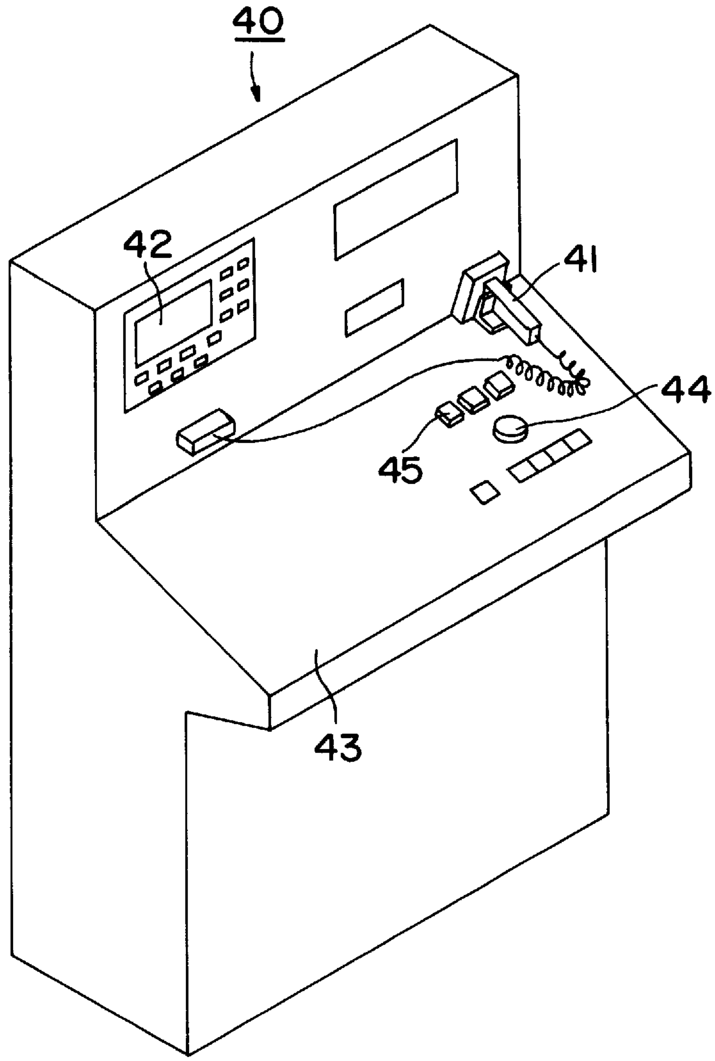
FIG. 2 is a perspective view showing the external construction of a controlling unit for controlling a cutting apparatus and a wire feeder of FIG. 1.

FIG. 2 is a perspective view showing the exterior construction of the controlling unit 40 for controlling the cutting apparatus 11 and the wire feeder 100 of FIG. 1. The controlling unit 40 is connected with the cutting apparatus 11 and the wire feeder 100 to control their operations. The controlling unit 40 is provided with a production data input, e.g. a bar-code reader 41 and/or a magnetic band or disc reader for inputting production data including data on the length of the wire W to be produced by the cutting apparatus 11, the kind of the wire, the number of lots, the kind of terminals to be mounted at the ends of the wires W, and the need of peeling in an intermediate position. The bar-code reader 41 reads the production data from a recording sheet on which the production data prepared in advance are recorded in the form of a bar code. The controlling unit 40 is also provided with a display 42. The display 42 displays the production data read by the bar-code reader 41, an instruction data given during the exchange of the wire W to be described later, and an abnormal state such as when the wire W has run short or is entangled. Further, the controlling unit 40 is formed with a work table 43 to facilitate an operation by an operator. On the work table 43, there are arranged a variety of operation buttons including a start button 44 and a release button 45 operated to resume the operation of the prefeeder 120 when it is interrupted as described later.

Figure 3:
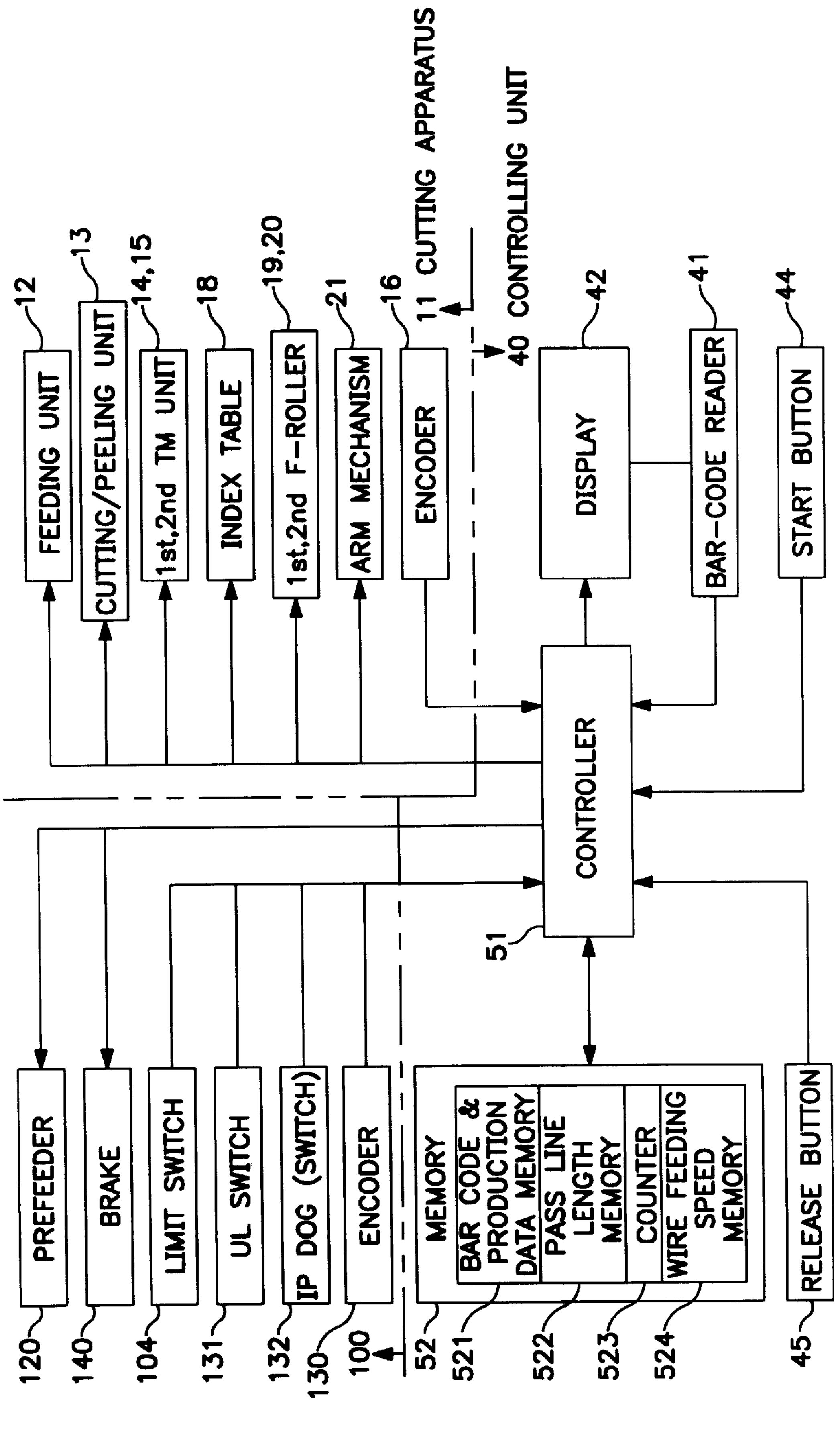
FIG. 3 is a block diagram showing the construction of the wire processing apparatus.

With reference to FIG. 3, the wire processing apparatus is provided with a controller 51 for controlling the entire apparatus. The controller 51 is built in the controlling unit 40 and comprises a CPU or the like. A signal from the encoder 16 of the cutting apparatus 11 is first sent to the controller 51 which in turn obtains the data concerning the length of the wire to be cut and the number of cutting, and controls the operation of the cutting/peeling unit 13, the first and second terminal mounting units 14, 15, the index table 18, the first and second feed rollers 19, 20 and the rotary arm mechanism 21. The following signals are particularly sent from the wire feeder 100 to the controller 51: the signals from the limit switch 104 for detecting the entanglement of the wire W, the upper limit switch 131, the initial position dog 132, and the encoder 130. In response to these signals, the prefeeder 120 and the brake 140 are controlled in accordance with a control procedure to be described later. Further, the production data read by the bar-code reader 41 of the controlling unit 40, and signals from the start button 44 and the release button 45 are sent to the controller 51. During the operation of the cutting apparatus 11, a necessary information is displayed on the display 42.

The controller 51 is connected with a memory 52. The production data given from the bar-code reader 41 include, for example, the data on the length of the wire W to be produced, a lot number Q and the kind of the wire W. The production data is stored in a production data storage area 521 of the memory 52. The storage area 521 has a capacity for storing at least a plurality of production data. Accordingly, when a plurality of bar codes are read by the bar-code reader 41 and a plurality of production data are given, these data are all stored in the storage area 521.

The memory 52 is provided with a pass line length area 522 for storing a length R of the pass line PH (hereafter, "pass line length") between the cutting position A and the withdrawing position B which are described with reference to FIG. 1 . As described above, since the accumulator 110 is disposed in the pass line PH, the pass line length R constantly varies during the operation of the cutting apparatus 11. Thus, the pass line length R to be stored in the area 522 is renewed as described later in accordance with the signal sent from the encoder 130 of the accumulator 110. In the area 522, a maximum pass line length $R_{MAX}$ when the movable roller 110C of the accumulator 110 is at its lower limit of its movable range (hereafter, "initial length" because the lower limit is the initial position), and the pass line length $R_{MIN}$ when the movable roller 110C is at the upper limit (hereafter, "upper limit length") are stored. The initial length $R_{MAX}$ and upper limit length $R_{MIN}$ are numerical values specified in accordance with the type of the accumulator 110. For example, in the case that numerical value input keys are arranged on the work table 43 of the controlling unit 40, these numerical values can be input using the input keys. In the area 522, there is also stored a pass line length RP (hereinafter, "wire exchange length") which satisfies an equation:

$$RP=L\times INT(R_{MAX}/L) \quad (1).$$

In equation (1), L denotes the length of the wire W to be produced, and INT is a round-down function to obtain an integer. Specifically, INT(X) is a maximum integer not larger than X (e.g. INT(4.6)=4). Equation (1) is satisfied when the movable roller 110C is in a position P in the construction of FIG. 1.

The memory 52 is provided with a counter area 523 for counting the number of produced wires W.

The memory 52 is also provided with a wire feeding speed area 524 for storing the feeding speed of the wire W. In the area 524, a wire feeding speed Vp of the prefeeder 120 and a wire feeding speed Vm of the pulley 110H which is calculated based on its angular displacement detected by the encoder 130 are stored. In the construction of FIG. 1, the controller 51 is so constructed as to control the prefeeder 120 to feed the wire in three different speeds: high speed, intermediate speed and low speed (see FIG. 6). The wire feeding speed Vp to be stored in the area 524 is renewed each time the controller 51 changes the feeding speed of the prefeeder 120.

Figure 4:
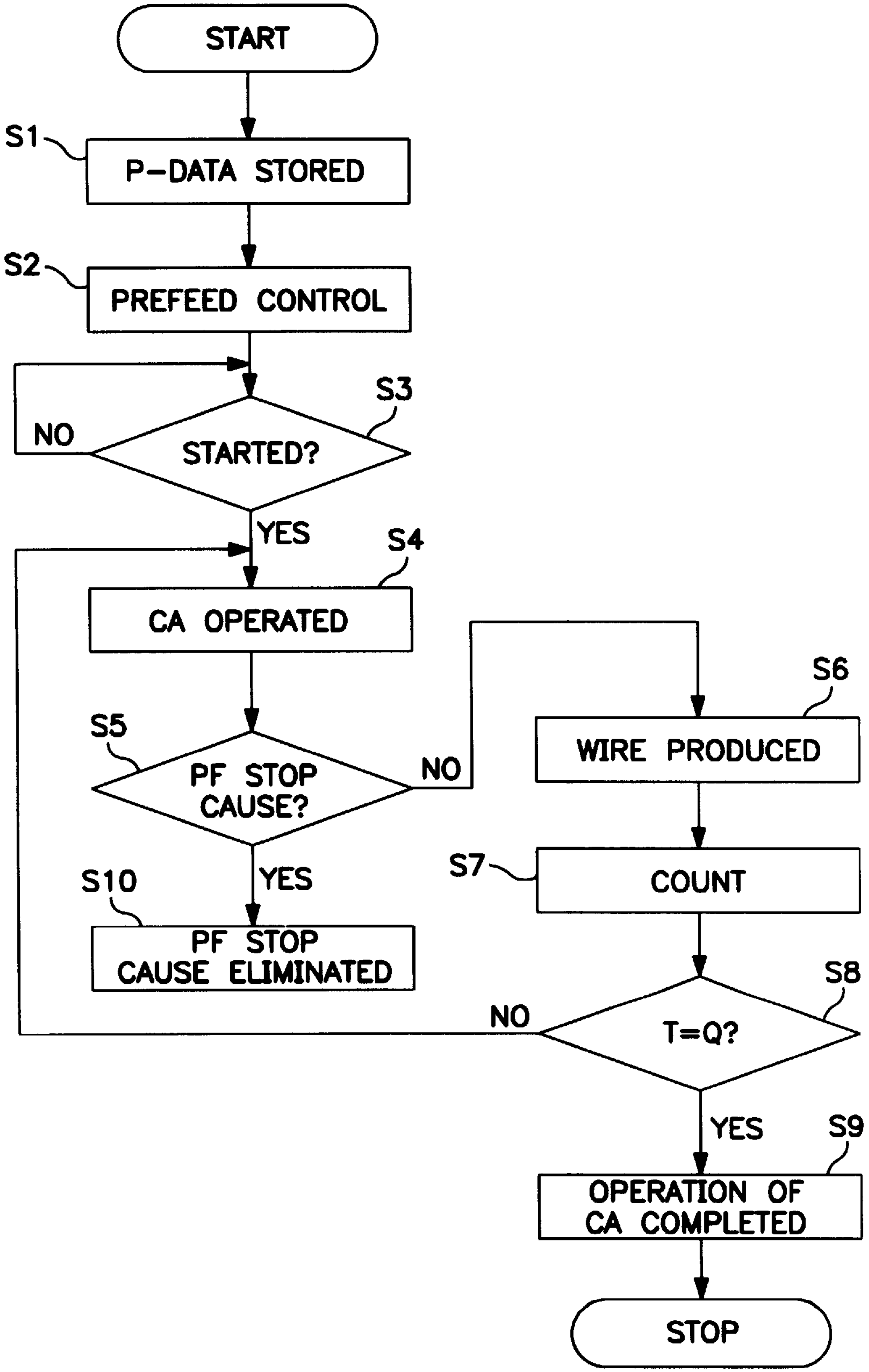
FIG. 4 is a flow chart showing a procedure of processing by the wire processing apparatus.

FIG. 4 is a flow chart showing a procedure of processing by the wire processing apparatus.

In the above construction, first, the production data are read from the bar code by the bar-code reader 41 and sent to the controller 51. The controller 51 stores the production data from the bar-code reader 41 in the area 521 of the memory 52 (Step S1), thereby completing a preparatory operation. At this time, it is preferable to read the production data from a plurality of bar codes by means of the bar-code reader 41 and to store a plurality of production data in the memory 52. This enables a faster transfer from production of one kind of wires to production of the other kind of wires because next production data are already stored in the memory 52. After the production data are stored in the memory 52, the controller 51 causes the stored data to be displayed on the display 42. While viewing the displayed data, an operator selects the wire W to be processed and sets the cutting apparatus 11.

A preparation for wire processing is completed after reading of the production data, and the operator turns on the accumulator 110. First, a prefeed control is performed to return the movable rollers 110C to its initial position (Step S2). After return of the movable roller 110C its initial position, the controller 51 discriminates whether the signal from the start button has been input thereto (Step S3). When the operator presses the start button 44, the operation of the cutting apparatus 11 starts (Step S4). Then, the controller 51 discriminates whether there is a cause to stop the prefeeder 120 as described in detail later (Step S5). If there is no such cause, the operation of the cutting apparatus 11 is continued to produce the wires used for the construction of wiring harnesses (Step S6). The produced wires W are counted in accordance with an output of the encoder 16, and a count result is stored in the area 523 of the memory 52 (Step S7). The stored number T of the produced wires is compared with the set lot number Q to discriminate whether the number T has reached the lot number Q (Step S8). Unless the number T has reached the lot number Q, a routine after Step S4 is repeated. If the number T has reached the lot number Q, the operation of the cutting apparatus 11 is completed (Step S9).

Figure 5:
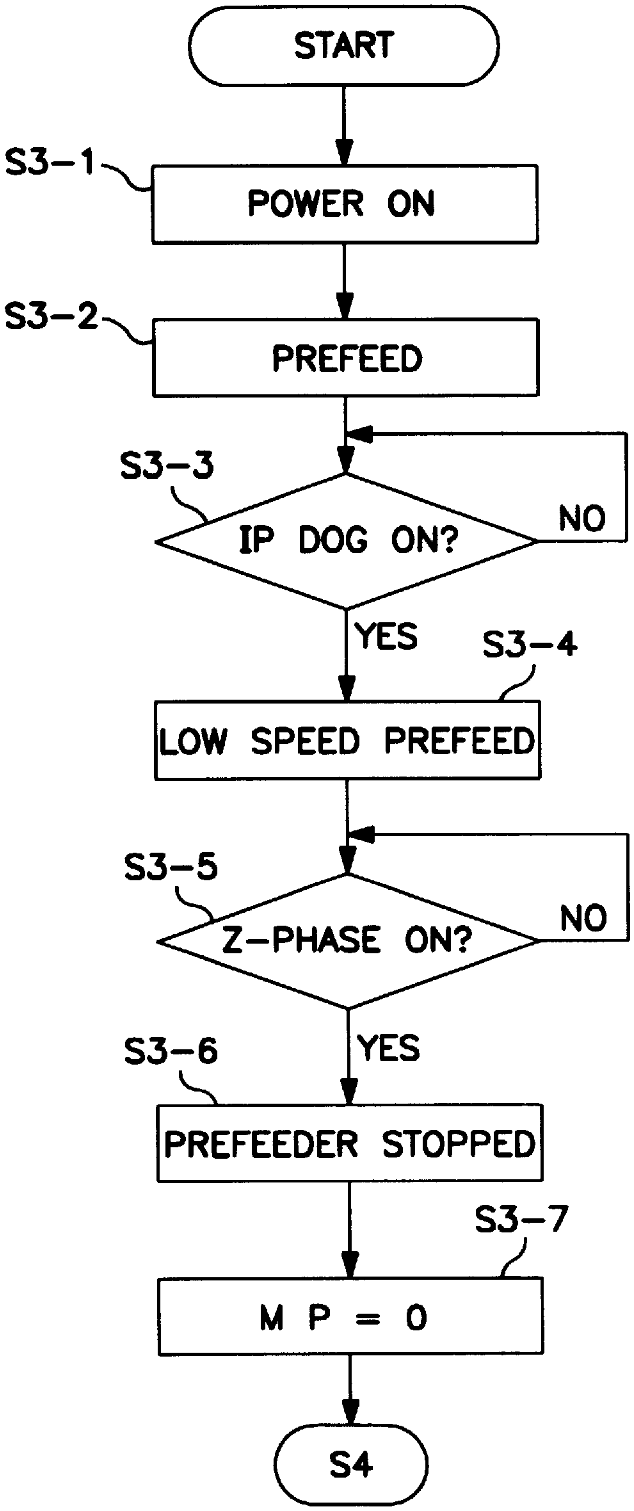
FIG. 5 is a flow chart showing in detail an initial position returning control of an accumulator.

FIG. 5 is a flow chart showing a detailed control executed to return the movable roller 110C to its initial position.

When the accumulator 110 is turned on (Step S3-1), the wire W is fed (Step S3-2), thereby successively storing the wire W. As a result, the movable roller 110C moves downward. The displacement of the movable roller 110C is being detected by the signal from the encoder 130. In this state, the controller 51 discriminates whether the signal from the initial position dog 132 is input thereto (Step S3-3). If the signal from the initial position dog 132 is being input, the controller 51 reduces the feeding speed of the prefeeder 120 (Step S3-4) and discriminates whether the output of the encoder 130 has reached its initial position (corresponding a position where the Z-phase is turned on) (Step S3-5). When the encoder 130 reaches its initial position, the prefeeder 120 is stopped, allowing the operation of the cutting apparatus 11 (Step S3-6). The initial position returning operation of the accumulator 120 is performed once after it is turned on. At this time, a pulse number MP of the encoder 130 is set to 0 (Step S3-7), and the pass line length R is calculated with a pulse number MP of the encoder 130 set to 0. This calculation result is stored in the pass line length area 522 of the memory 52 as the initial length $R_{MAX}$.

Figure 6:
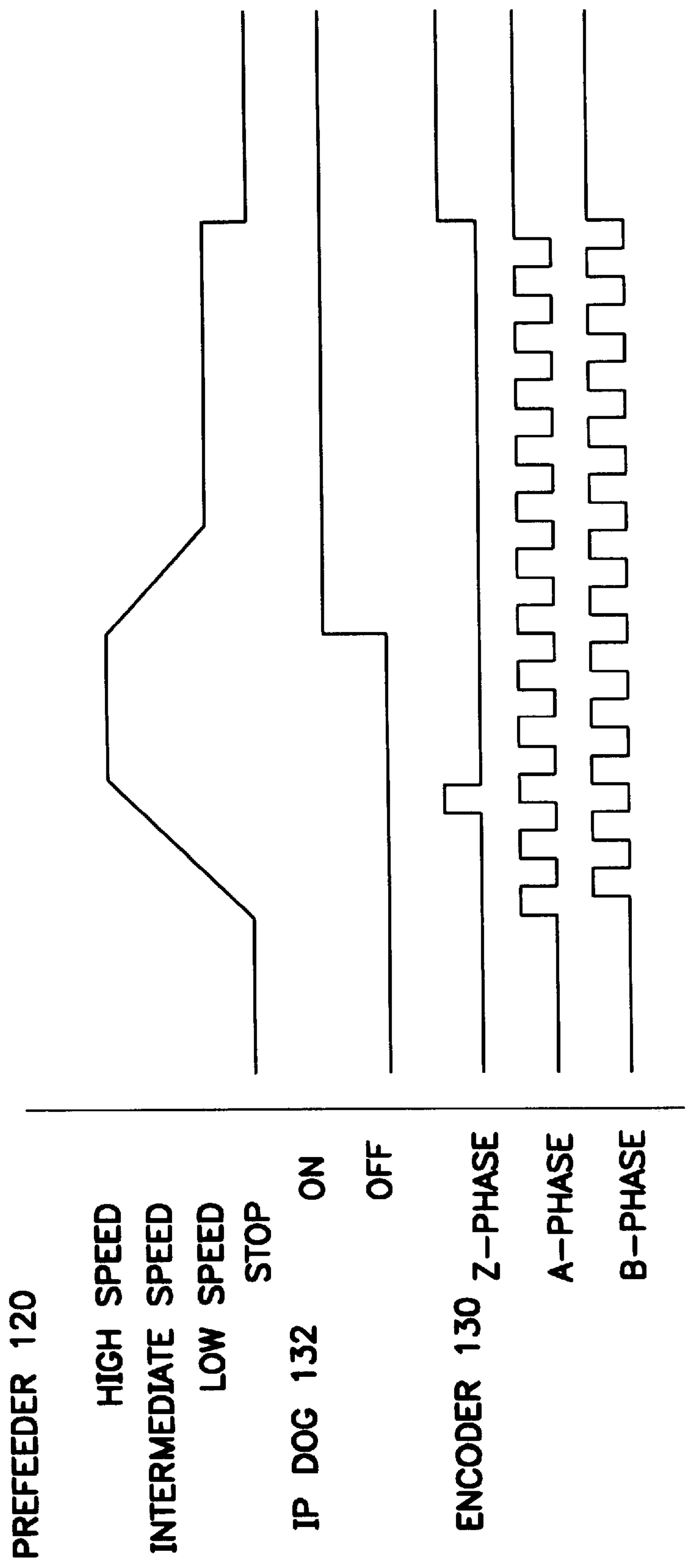
FIG. 6 is a timing chart showing a relationship between a prefeeder, an initial position dog and an encoder during an initial position returning operation in prefeed.

FIG. 6 is a timing chart showing a relationship between the prefeeder 120, the initial position dog 132, and the encoder 130 in the initial position returning operation in prefeed.

As shown in FIG. 6, by providing the initial position dog 132 to reduce the feeding speed of the prefeeder 120 at a specified timing, the prefeeder 120 can be stopped when the phase of the encoder 130 reaches the initial position (where the Z-phase is turned on).

Figure 7:
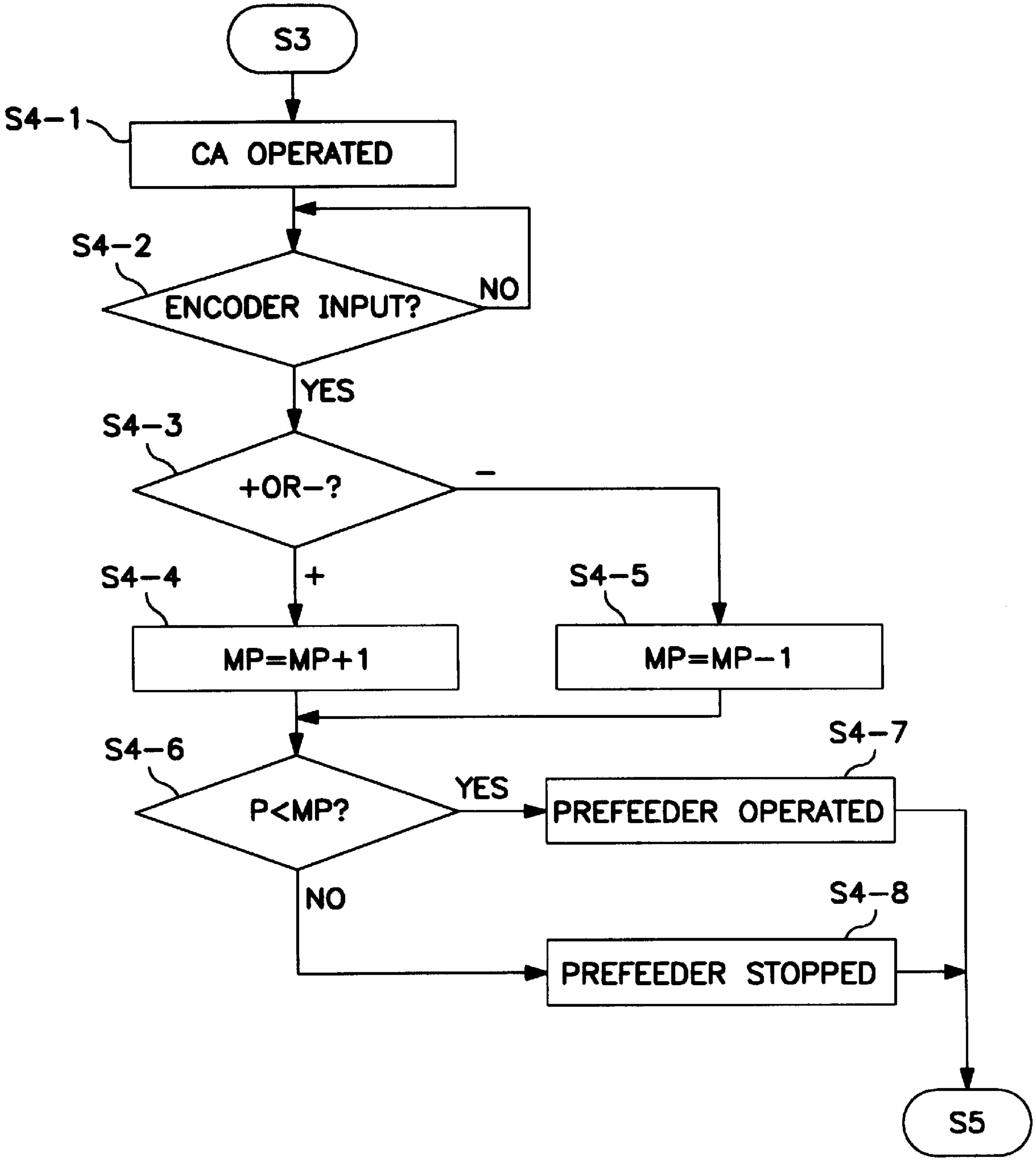
FIG. 7 is a flow chart showing a procedure of controlling the prefeeder while the wire is fed to the cutting apparatus in operation.

FIG. 7 is a flow chart showing a control executed in Step S4 (see FIG. 4) for the prefeeder 120 when the wire W is supplied to the cutting apparatus 11 in operation.

First, when the cutting apparatus 11 starts its operation (Step S4-1), the controller 51 discriminates whether the signal from the encoder 130 is being input thereto, i.e. the movable roller 110C is being displaced (Step S4-2). If the encoder 130 is sending the signal, the controller 51 discriminates whether an input of the encoder 130 is plus (or positive) or minus (or negative) in order to discriminate a displacing direction of the movable roller 110C (Step S4-3). More specifically, the A-phase and the B-phase of the encoder 130 are displaced by 90° as well known (see FIG. 6). Accordingly, by discriminating, when a pulse of one phase is in high state, whether a pulse of the other phase is also in high state, the moving direction of the movable roller 110C can be easily detected. In the aforementioned example, the encoder 130 is set such that the pulse number MP is positive when the movable roller 110C is moved toward its upper limit position, whereas it is negative when the roller 110C is moving toward its initial position. Thus, when the output of the encoder 130 is plus, an increase is added to the pulse number MP (Step S4-4). When the output of the encoder 130 is minus, a decrease is subtracted from the pulse number MP (Step S4-5). In this way, the detected position of the movable roller 110C can be renewed.

The renewed pulse number MP is compared with a pulse number P corresponding to the wire exchange length RP (Step S4-6). If MP<P (the pass line R is shorter than the wire exchange length RP), the prefeeder 120 is operated or the feeding speed thereof is increased to extend the pass line length R (Step S4-7). If MP<P (the pass line length R is longer than the wire exchange length RP), the prefeeder 120 is stopped or the feeding speed thereof is decreased to shorten the pass line length R (Step S4-8). In this way, a control is made such that the pass line length R is constantly equal to the wire exchange length RP.

Next, the aforementioned prefeeder stop cause (see Step S5 of FIG. 4) is described in detail. The prefeeder stop cause refers to a case where the wire processing by the cutting apparatus 11 is to be hindered unless the prefeeder is stopped. In this embodiment, it specifically refers to a case where the kind of the wire W is changed, a case where the wire W is entangled or a case where a wire joint is disconnected.

Figure 8:
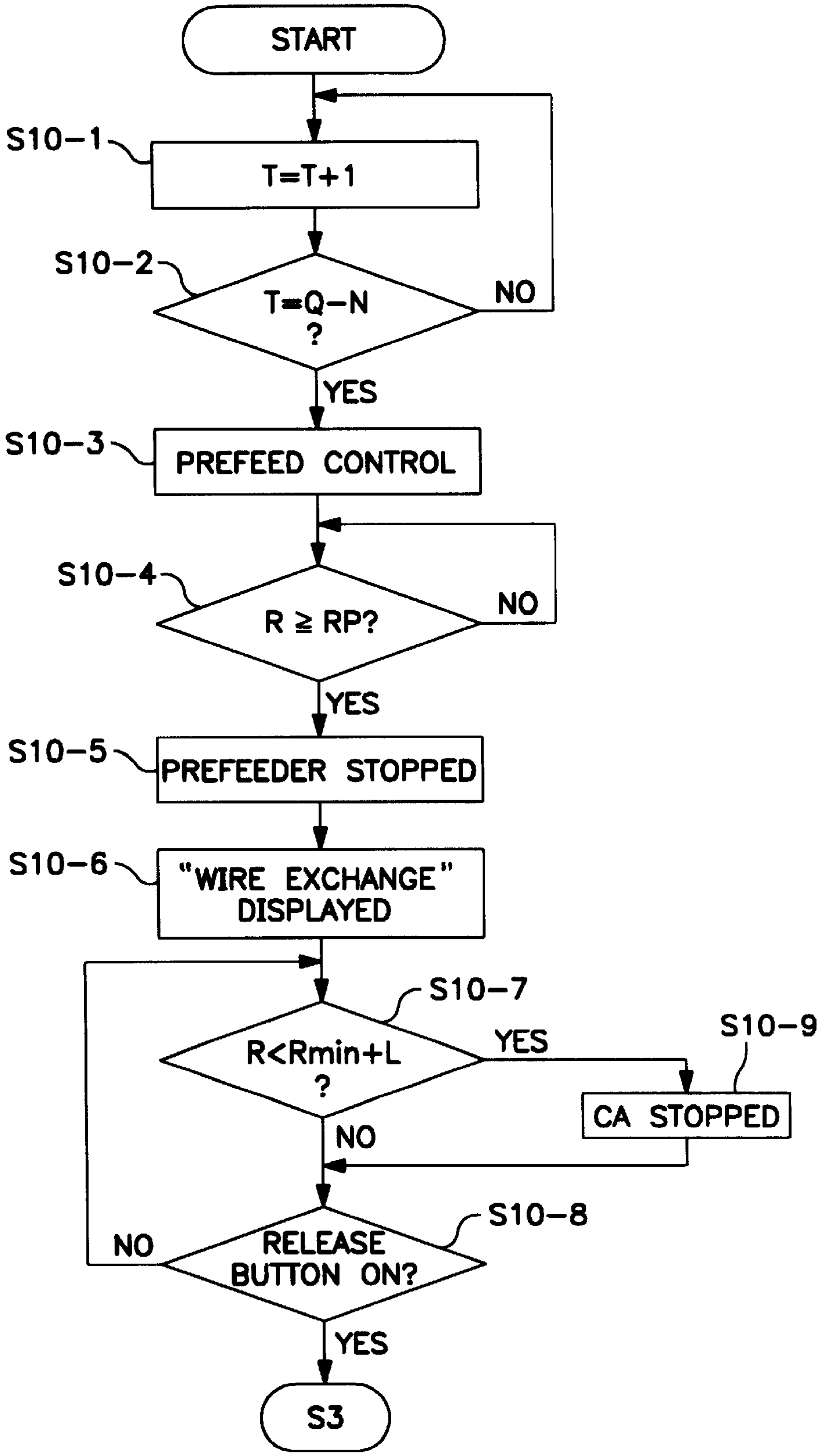
FIG. 8 is a flow chart showing a procedure of a wire exchange operation.

First, the case where the kind of the wire W is changed is described with reference to FIG. 8 which is a flow chart showing a wire exchange operation.

In order to prevent production of a waste wire W (wire W having a length shorter than that of the wire to be produced) while exchanging the kind of the wire W, the following procedure is adopted in this embodiment. First, when the wire W is measured and cut by the cutting apparatus 11, the number T of the produced wires is counted in a manner as described with respect to Step S7 of FIG. 4, and the renewed number T is stored in the area 523 of the memory 52 (Step S10-1). The number T is then compared with a result of subtracting a predetermined number N from the lot number Q (Step S10-2). The number N is defined as:

$$N=INT(R_{MAX}/L) \qquad (2)$$

where INT is a round-down or cut-off function to obtain an integer. If the number N is set as in equation (2), the controller 51 sets the pass line length R as follows while the wire W stored in the accumulator 110 is being fed (Steps S10-3, S10-4):

$$\text{Pass Line Length } R > \text{Wire Exchange Length } RP = N \times L. \qquad (3)$$

The prefeeder 120 can be stopped (Step S10-5) when equation (3) is satisfied. As described with reference to FIG.

7, the controller 51 controls an amount of the wire W stored in the accumulator 110, i.e. a feed amount of the prefeeder 120 in such a manner as to satisfy equation (1). Accordingly, in many cases, the prefeeder 120 is immediately stopped when the discrimination result in Step S10-2 is in the affirmative.

For example, if the initial length $R_{MAX}$, the wire exchange length RP and the length L of the wire W to be produced are 50 m, 48 m and 3 m, respectively, after the number N reaches 16, the prefeeder 120 is immediately stopped when R becomes equal to RP. Then, a display is made on the display 42 (Step S10-6) to urge the operator to connect the wire with another wire, enabling a wire exchange operation without wasting the wire W. The significance of this control is that the cutting apparatus 11 is not necessarily stopped while the operation of the prefeeder 120 is interrupted. When the prefeeder 120 is stopped, the operator can perform the wire exchange operation. Simultaneously with this operation, the cutting apparatus 11 continues its operation to successively process the wire W stored in the accumulator 110. During the exchange operation, the controller 51 discriminates whether the pass line length R satisfy the following condition (Step S10-7):

$$R<R_{MIN}+L \qquad (4).$$

In the case that the operator completes the exchange operation and presses the release button 45 (Step S10-8) before the above condition is satisfied, it is detected and Step S3 follows to continuously process the wire W. The cutting apparatus 11 is stopped only when the condition of FIG. 4 is satisfied (Step S10-9).

In making the discrimination in Step S10-4, the following equation (3A) may be adopted:

$$\text{Pass Line Length } R>\text{Wire Exchange Length } RP+\alpha \qquad (3A)$$

where $\alpha$ is a constant<0. The constant $\alpha$ is used to compensate for measurement errors of the cutting apparatus 11. For example, if the wire exchange length RP and the length L of the wire W to be produced are 100 m and 5 m, respectively, there can be produced 20 wires, 100÷5=20 in calculation. However, there is in reality an error of about±1 mm. There is no problem in the case of a minus error (4.99 m). In the case of a plus error (5.01 m), 100/5.01=19+0.96 (equal or corresponding to 4.8 m) wires, i.e. one wire is short and a waste wire is produced. In order to avoid this situation, the measurement errors of the cutting apparatus 11 are compensated by using equation (3A).

Figure 9:
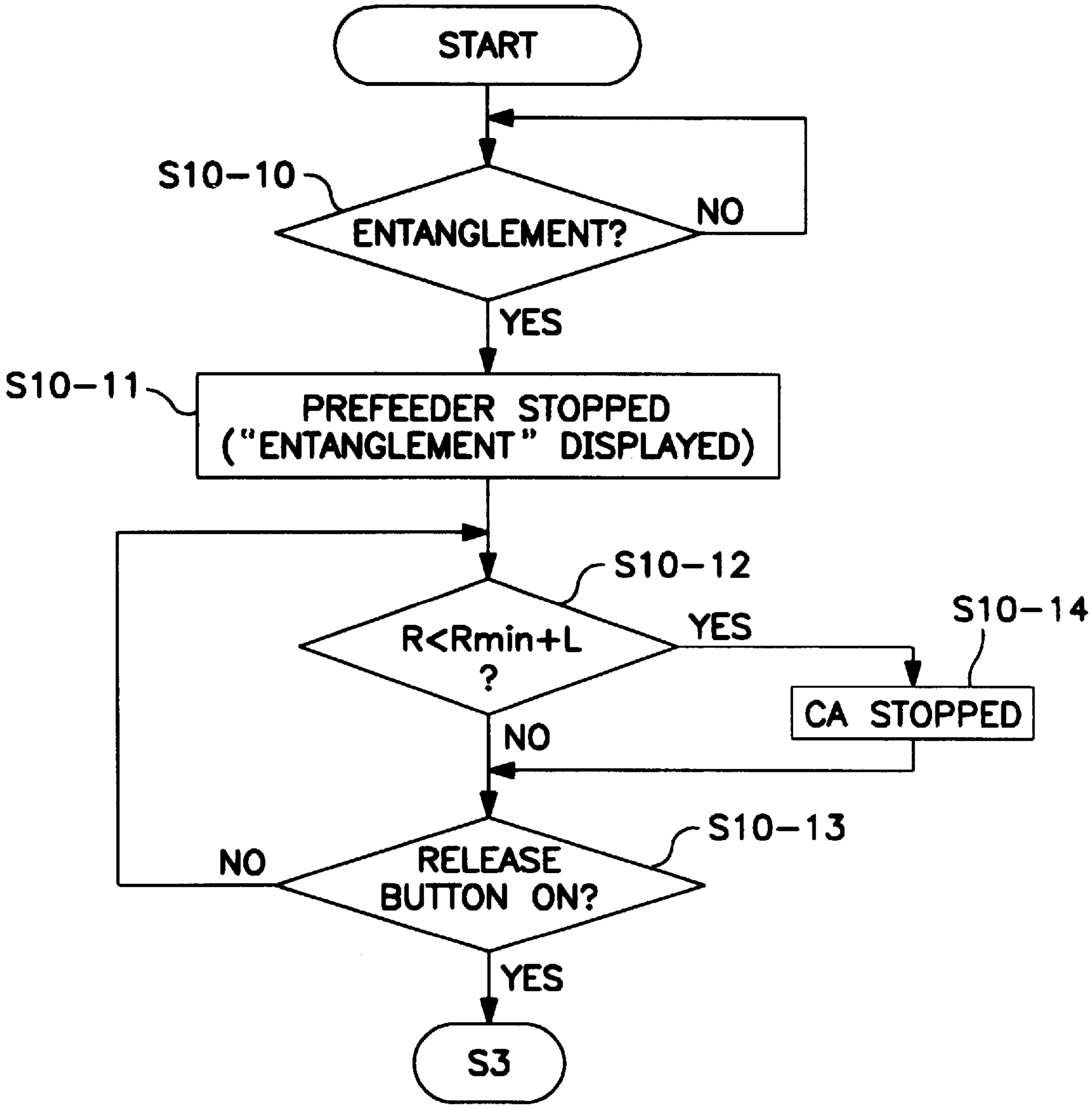
FIG. 9 is a flow chart showing a procedure of a wire disentangling operation.

Next, the case where the wire W is entangled is described as a second example of the prefeeder stop cause with reference to FIG. 9 which is a flow chart showing a procedure of disentangling the wire W.

First, when the wire W gets entangled, the pivotal arm 103 of the arrangement table 101 makes a pivotal movement, which is in turn detected by the limit switch 104 (Step S10-10). Upon receipt of the signal from the limit switch 104, the controller 51 immediately stops the prefeeder 120 and an occurrence of entanglement is displayed on the display 42 (Step S10-11). The cutting apparatus 11 remains in operation in this case as well, and it is not stopped so long as the wire W is stored in the accumulator 110.

In accordance with the signal from the encoder 130, the controller 51 makes a discrimination as defined in equation (4) (Step S10-12). In the case that the operator disentangles the wire W and presses the release button 45 (Step S10-13) before the condition of equation (4) is satisfied, it is detected and Step S3 follows to continuously process the wire W. The cutting apparatus 11 is stopped only when the condition of equation (4) is satisfied (Step S10-14).

Figure 10:
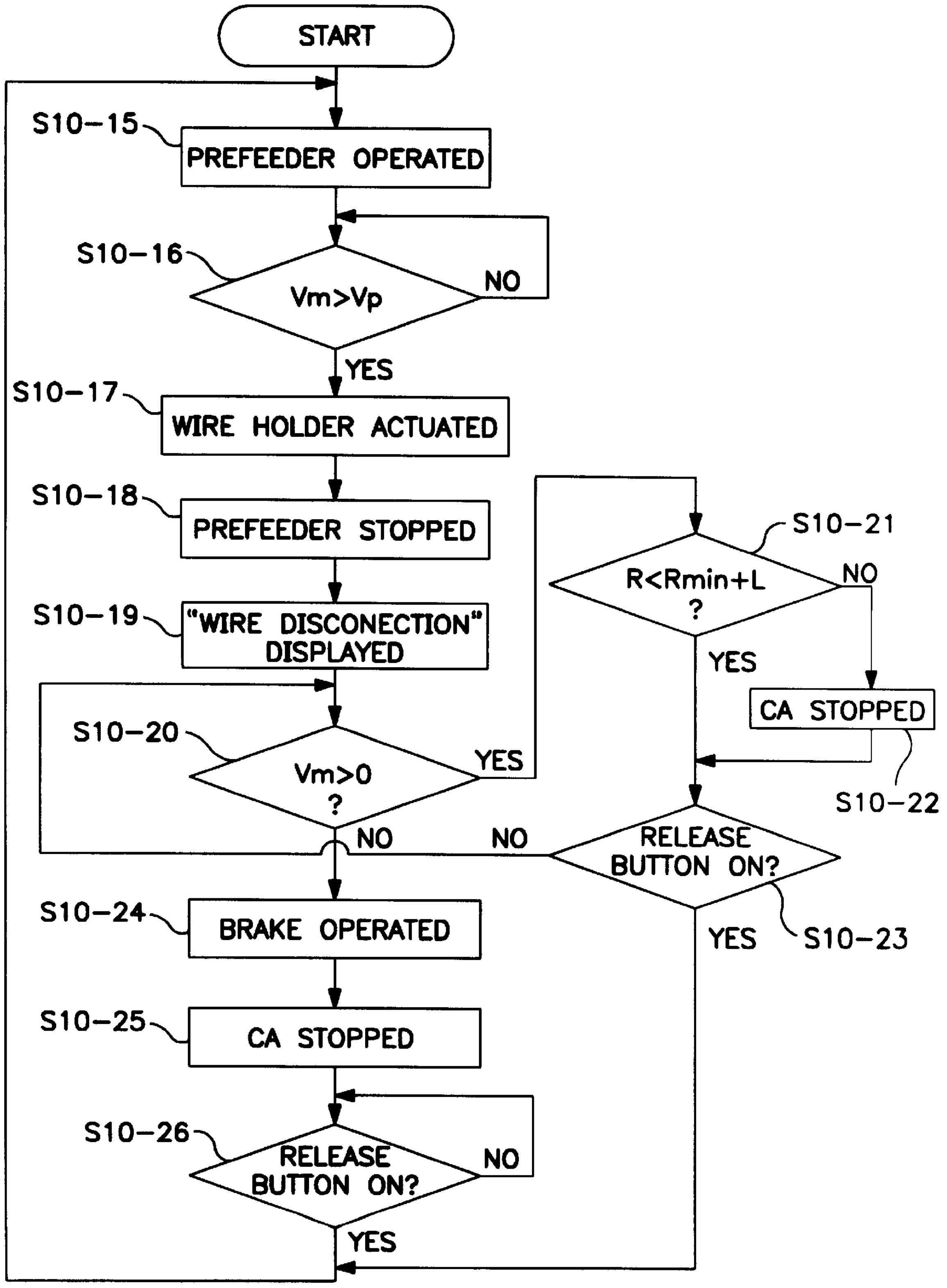
FIG. 10 is a flow chart showing a procedure of a wire disconnection handling operation.

The case where the wire joint is disconnected is described as a third example of the prefeeder stop cause with reference to FIG. 10 which is a flow chart showing a procedure of handling the disconnection of the wire joint.

In this embodiment, a sensor or like device for detecting the disconnection of the wire is not specially provided. Instead, as described above, the wire feeding speed Vp of the prefeeder 120 is compared with the wire feeding speed Vm calculated based on the angular displacement of the pulley 110H mounted on the encoder 120 (Step S10-16). If the wire W were disconnected in the pass line PH, it would be pulled by the weight of the movable roller 110C, making the wire feeding speed Vm of the pulley 110H faster than the wire feeding speed Vp of the prefeeder 120. Upon detecting this, the controller 51 stops the prefeeder 120 (Step S10-17), actuates the wire holder 150 to hold the wire W (Step S10-18), and displays the disconnection of the wire joint on the display 42 (Step S10-19) at the same time. Since the brake 140 is not operated at this stage, the wire W stored in the accumulator 120 can be fed to the cutting apparatus 11.

In this case, it is necessary to determine whether the operation of the cutting apparatus 11 should be continued depending upon where in the pass line PH the wire is disconnected. If the wire W is disconnected between the cutting position A and a holding position C by the wire holder 150, the feed of the wire W stored in the accumulator 110 is stopped. Accordingly, the cutting apparatus 11 needs to be immediately stopped before the end of the wire W goes thereinto. On the other hand, while the end of the disconnected wire remains between the withdrawing position B and the holding position C, the cutting apparatus 11 needs not necessarily be stopped until the wire stored in the accumulator 110 is fed.

Accordingly, in this embodiment, whether the accumulator 110 is in operation after the wire holder 150 is stopped, i.e. the wire feeding speed Vm detected by the encoder 130 is larger than 0 is discriminated (Step S10-20) as shown in FIG. 10.

In the case that the end of the wire remains between the withdrawing position B and the holding position C by actuating the wire holder 150 in Step S10-17 (YES in Step S10-20), the operation of the cutting apparatus 11 can be continued while the accumulator 110 is normally operated and the prefeeder 120 is kept out of operation. Then, the discrimination in accordance with equation (4) is made (Step S10-21). The cutting apparatus 11 is stopped only when the condition of equation (4) is not satisfied (Step S10-22). On the other hand, if the discrimination result in Step S10-21 is in the affirmative, the controller 51 discriminates whether the signal from the release button 45 has been input thereto (Step S10-23). In the case that the operator connects the wires W and presses the release button 45, Step S10-15 follows to resume the prefeed operation. On the other hand, unless the release button 45 has been pressed, Step S10-20 follows to discriminate again whether the end of the disconnected wire W has passed the holding position C in the accumulator 110.

On the other hand, in the case that the end of the disconnected wire w has already moved downstream from the holding position C when the wire holder 150 was actuated in Step S10-17 (NO in Step S10-20), the wire feeding speed Vm becomes 0 or below. In such a case, the brake 140 is immediately operated to lock the accumulator 110 (Step S10-24) and, simultaneously, the cutting apparatus

11 is stopped (Step S10-25) so as to prevent an entrance of the wire end into the cutting apparatus 11. In this embodiment, by stopping the cutting apparatus and operating the brake 140 simultaneously, the wire end can be stopped in an imaginary position D (see FIG. 1) where the movable roller 110C of the accumulator 110 is locked even if the wire end has already passed the holding position C. Accordingly, the entrance of the wire end into the cutting apparatus 11 can be more securely prevented. In such a case, similar to the usual wire disconnection handling operation, the prefeed operation is resumed after discriminating that the operator has connected the wires W and turned the release button 45 on (Step S10-26).

As described above, according to the foregoing embodiment, even if the wire processing is to be hindered unless the prefeeder 120 is stopped in the case that the kind of the wire is changed, the wire W is entangled or the wire joint is disconnected, the cutting apparatus 11 needs not be immediately stopped, thereby realizing a remarkable effect that the operation of the cutting apparatus 11 needs to be least interrupted.

Particularly, when the above construction is adopted, there is an advantage that material can be effectively used since the wire W is not wasted when it is exchanged.

By setting $N=INT(R_{MAX}/L)$, the prefeeder can be stopped when the wire W most effectively remains in the pass line. As a result, it takes a longer time for the pass line length R to satisfy the condition: $R<R_{MIN}+L$ after the prefeeder is stopped. This advantageously lengthens a time to perform the wire exchange operation without interrupting the operation of the cutting apparatus.

Further, the wire disconnection can be detected without providing any special sensor before the wire end enters the pass line PH. Accordingly, the entrance of the wire end into the pass line can be advantageously prevented without increasing the number of parts.

What is claimed is:

1. A wire processing apparatus comprising:
   - a pass line (PH) having an upstream end (B) in proximity to a supply of wire (W) and a downstream end, said pass line (PH) defining a length (R) between said upstream and downstream ends for accommodating the wire (W),
   - a prefeeder (120) for feeding the wire (W) into the pass line (PH),
   - a cutting apparatus (11) for cutting the wire (W) in a cutting position (A) at the downstream end on the pass line (PH),
   - a feeding unit (12) in proximity to the downstream end of the pass line (PH) for feeding the wire (W) to the cutting position (A),
   - an accumulator (110) which is disposed in the pass line (PH) between the prefeeder (120) and the feeding unit (12), said accumulator (110) including means for adjustably accumulating a selected amount of the wire (W) to change the length (R) of the pass line (PH),
   - a detector (103, 104) for detecting during wire processing whether there is any prefeeder stop cause which requires the prefeeder (120) to be stopped, and
   - a controlling unit (40) for stopping the prefeeder (120) in response to a detection of a prefeeder stop cause by the detector (103, 104) and causing the feeding unit (12) to feed the wire (W) from the accumulator (110) to the cutting apparatus (11) to continue operation of the cutting apparatus (11) by shortening the length (R) of the pass line (PH) while the operation of the prefeeder (120) is interrupted.

2. A wire processing apparatus according to claim 1, wherein the accumulator (110) includes means for gradually changing the length (R) of the pass line (PH), between a maximum pass line length $R_{MAX}$ and a minimum pass line length $R_{MIN}$.

3. A wire processing apparatus according to claim 2, wherein the controlling unit (40) includes means for stopping the cutting apparatus (11) while the operation of the prefeeder (120) is interrupted and when the length R of the pass line (PH) satisfies a condition, $R<R_{MIN}+L$ where L denotes the length of the processed wire (W) to be produced.

4. A wire processing apparatus according to claim 3, wherein the controlling unit (40) includes means for selecting a number of lots (Q) to be produced, the controlling unit (40) further including a counter (523) for counting wire cuttings produced by the cutting apparatus (11), said controlling unit (40) further being operative such that, in a case that wire cuttings produced by the cutting apparatus reaches a number which is smaller by a predetermined number N than the number of lots (Q) to be produced, the controlling unit (40) stops the prefeeder (120) when the length (R) of the pass line (PH) is substantially $N\times L$.

5. A wire processing apparatus according to claim 4, wherein the number N is determined: $N=INT(R_{MAX}/L)$ where INT is a round-down function to obtain an integer.

6. A wire processing apparatus according to claim 1, wherein the detector means further comprises means (110H, 130) for determining whether a wire disconnection has occurred by determining if the wire (W) is fed to the accumulator (110) at a higher speed (Vm) than a feeding speed (Vp) of the prefeeder (120).

7. A wire processing apparatus according to claim 1, wherein the accumulator (110) comprises at least two rollers, one of said rollers being a movable roller (110C) for varying the length (R) of the pass line (PH).

8. A wiring processing apparatus according to claim 6, further comprising means for determining a relative location of the movable roller (110C) and means for calculating the length (R) of the pass line (PH) based on the location of the movable roller (110C).

9. A wire processing apparatus according to claim 8, further comprising at least one roller spaced from the movable roller (110C).

10. A wire processing apparatus according to claim 9, wherein each of said rollers is configured to receive a plurality of passes of said wire (W) thereabout.

* * * * *